June 8, 1954   F. N. ROTHACKER   2,680,833
EARTH CORE MAGNETIC ANALYZER
Filed Oct. 24, 1950   2 Sheets-Sheet 1
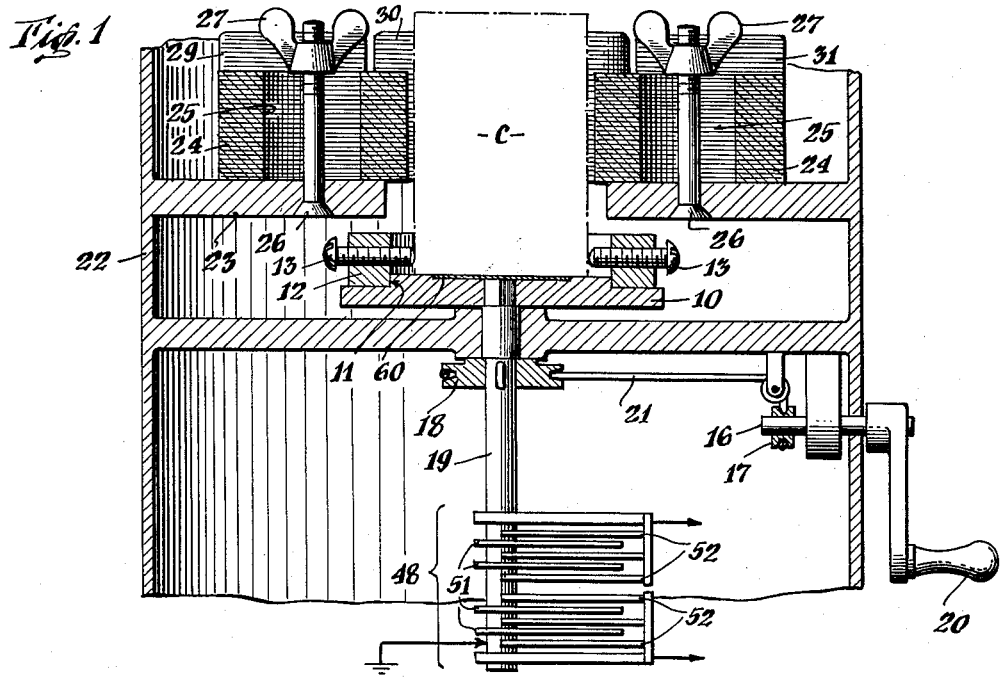
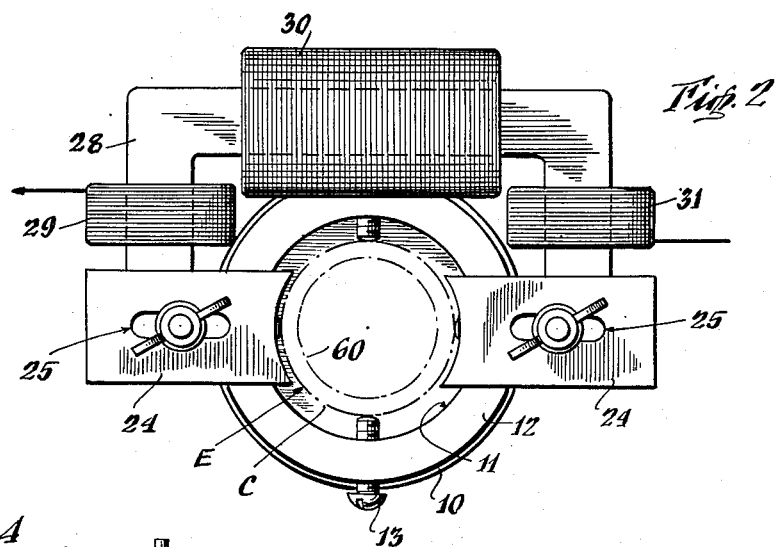
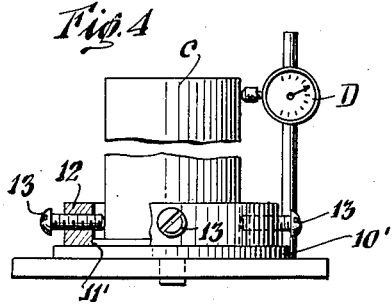
INVENTOR.
Francis Neill Rothacker
BY
Bohleber, Fassett & Montstream
ATTORNEYS

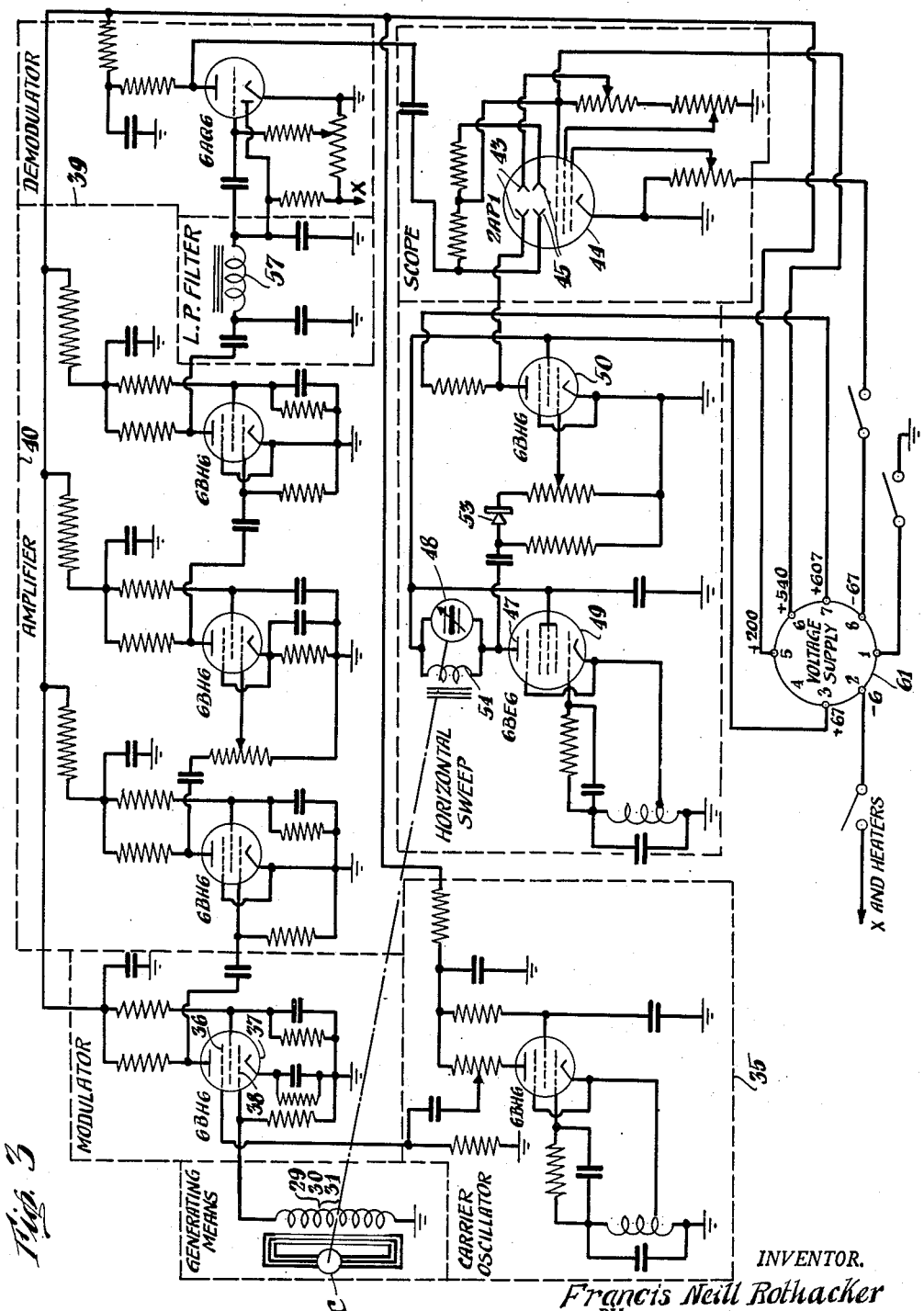

Patented June 8, 1954

2,680,833

UNITED STATES PATENT OFFICE 2,680,833

EARTH CORE MAGNETIC ANALYZER

Francis Neill Rothacker, Rye, N. Y., assignor to H. M. R. Electronics, Incorporated, New Canaan, Conn., a corporation of Connecticut Application October 24, 1950, Serial No. 191,865

11 Claims. (Cl. 324—14)

The invention relates to a magnetic analyzer for determining the magnetic orientation of a material such as an earth core removed from wells and particularly oil wells although it has general applicability. It is of importance to know the orientation of a core removed from a well and this can be accomplished because such cores retain earth magnetism, the location of the poles of which can be determined although such earth magnetism is very small. Knowing the magnetic orientation of an earth core, that core can be oriented with respect to the earth's magnetic North and South Poles.

It is an object of the invention to construct a new and novel earth core analyzer which indicates the magnetic orientation of the core.

Another object of the invention is to construct an earth core analyzer utilizing the magnetic orientation of the core and which amplifies the magnetic strength of the earth core magnetism.

A still further object is to construct an earth core analyzer which rotates the core at hand operated speeds.

Another object is to construct an earth core analyzer in which the electronic amplifier uses a carrier frequency which is modulated by the earth core signal.

Other objects of the invention will be apparent from the following description when taken in connection with the accompanying drawings illustrating a preferred embodiment of the invention in which:

Figure 1 is a cross section through a portion of the analyzer in more or less illustrative form to illustrate the construction thereof;

Figure 2 is a plan view of the portion of the earth core analyzer which rotates the earth core and signal generating means by which the magnetic poles of the rotating core generate the core signal;

Figure 3 is a schematic circuit diagram forming the electrical portion of the analyzer; and Figure 4 is a diagrammatic illustration of the method and construction for initially centering the earth core.

An earth core is a magnet, although a weak one, yet it retains the earth magnetism contained therein when a part of the earth's strata which provides the indication by which the orientation of the core with respect to the North and South of the earth may be determined. In other words the core is a magnet so that determination of the location of the poles at the periphery of that magnet or earth core provides a method by which the earth core may be oriented as to its position in the earth. The core is rotated between the pole pieces of a voltage generating means including a coil which generates a voltage or current therein and by locating the point on the core where a peak voltage is generated, a pole on the core is located. The rotating core and the coil or coils constitute a voltage generating means. It is the relative rotation between the earth core on the core holding means and the voltage generating means which generates the voltage in the latter irrespective of which means is rotated.

The core analyzer includes a core holding means such as a chuck of any suitable kind for holding the earth core C, that illustrated including a rotatable plate 10 having a shoulder 11. A ring 12 rests upon the plate so that the inner diameter thereof engages the shoulder 11 and centers the same upon the rotating plate. The ring carries adjustable gripping means of any form which are shown as screws 13 located around the ring. These screws grip the earth core C and retain it centered with respect to the ring 12, and because of the shoulder 11, retains the core centered with respect to the rotating plate 10. The plate is rotated by hand in any suitable fashion that illustrated including a shaft 16, suitably journalled, carrying a pulley 17 which drives a pulley 18 carried by shaft 19 and rotated by the handle 20 through a belt 21. This drive or rotating mechanism is illustrative only and any suitable drive connection may be used.

For convenience in centering the earth core on the rotatable plate 10, a duplicate plate 10' is provided as shown in Figure 4 upon which the ring 12 rests and is centered thereon by the shoulder 11'. The earth core C is then inserted within the ring 12 and the screws 13 tightened to grip the core. Rotating the plate 10' and the earth core with an indicator D engaging the outer circumference of the core, determines whether or not the core is in axial alignment and if not, the screws are adjusted until alignment is secured. A deviation of not more than .004 of an inch on the indicator D shows sufficient centering of the core. The ring 12 with the core C secured therein is then placed on the rotatable plate 10 of the core analyzer of Figure 1.

The earth core when mounted upon the core holding means and rotated constitutes a rotating magnetic field which generates a voltage in a generator means of a suitable kind including coil means. Because of the weakness of the magnetic field in the earth core, the generator means should include a metallic armature and coil means around the armature. A voltage is generated by relative rotation between the generator means and the earth core but the construction is considerably simpler if the earth core is rotated relatively to a stationary generator means as shown.

The core C is positioned upon the core holding means between pole pieces 24 which are of metal laminations. These preferably are adjustable towards and away from the earth core in any suitable fashion, the construction illustrated providing slots 25 in the pole pieces through which a screw 26 passes and the pole pieces are clamped in position by wing nuts 27. The pole pieces are supported such as by resting upon a partition 23 carried by the box or casing 22. The sides of the pole pieces 24 abut against a laminated metallic generator core or armature 28, which may be of U-shaped form, carrying coil means including coils 29, 30 and 31 having a great many turns thereon so that rotation of the magnetic earth core generates a voltage in the coils which can be amplified. It is desirable that the pole pieces be adjustable so that cores of different diameters may be analyzed and also so that the pole pieces may be brought as closely as possible to the core whereby the gap therebetween may be a minimum; hence, undue losses are avoided. The three coils in the analyzer as constructed have a total of sixty-eight thousand turns.

The voltage generated in the coils of the generating means by the rotation of the earth core between the pole pieces is amplified by a suitable electronic circuit having a high degree of amplification. A preferred circuit is shown diagrammatically in Figure 3 which includes an oscillator 35 generating a frequency of about five thousand cycles and the earth core signal generated in the coils is used to modulate this carrier frequency. The frequency of the carrier is not important and may be anything such as from a thousand to twenty thousand cycles frequency; however, the five thousand cycle is selected because inexpensive standard circuit components may be used.

The oscillator 35 need not be particularly described since it is of known construction. The carrier frequency generated thereby is fed to the grid 36 of a modulator tube 37. The control grid 38 of the modulator tube is connected with the series connected coils 29, 30 and 31 of the generator means so that the voltage generated by rotating the core modulates the carrier frequency. The signal modulated frequency or wave is then amplified in an amplifier 40 shown to include three amplifier tubes and the output thereof is fed to a demodulator or detector and amplifier 39. One of the amplifier tubes may be biased to pass the positive voltage wave which is shown as the second amplifier tube.

The demodulated and amplified signal from the earth core is applied to an indicator of any suitable kind which would show or make a record of the curve of the voltage generated by the earth core in the voltage generating means in a vertical direction and indicate the position of the curve with respect to each revolution of the earth core as in a horizontal direction. There are mechanical indicating means which accomplish this result; however, a cathode ray oscilloscope is a convenient device of the electronic type. The output of the amplifier portion of the demodulator and amplifier tube is connected to the vertical deflecting means, such as the plates 45 of a cathode ray tube or scope 44. The deflecting plates 43 deflect the beam of the cathode ray tube in the other or horizontal direction once for each rotation of the core.

The horizontal beam sweep or deflecting means is provided in the form of a beam deflecting voltage generating means which generates a voltage wave for each revolution of the earth core C. The means shown includes an oscillator having a condenser 48 in the plate circuit of the oscillator tube 49 which condenser includes rotating plates 51 connected with the drive shaft 19 of the rotatable chuck or plate 10 so as to rotate therewith. The rotating condenser plates 51 are rotated with the shaft once for each rotation of the plate 10 and hence once for each rotation of the earth core C and control the horizontal sweep in step with the rotation of the core. Preferably the condenser is a split stator type so that any static generated in the bearings of the condenser cancel out.

The fixed or stator plates 52 of the rotating condenser are connected in the plate circuit 47 of an amplifying tube 49, the signal of which is preferably further amplified in an amplifier 50 and the voltage generated and amplified is applied to the horizontal sweep means such as the deflecting plates 43 of the cathode ray tube 44. The beam of the cathode ray tube is therefore deflected horizontally across the tube and back for each revolution of the earth core. Preferably the signal or voltage from the generating means developed by the rotating earth core C is adjusted in the oscilloscope so that the beam trace is at a 45° angle which results in a longer trace or in effect makes a two inch cathode ray tube have the effectiveness of about a four inch tube. It is clear, however, that the cathode ray tube may be adjusted so that a pip or peak shows on the screen if desired. A further advantage in a 45° trace is that by locating the spot at the center of the trace, the North or South Pole, as it may be, of the core magnetism, will be at the edge of the pole piece of opposite polarity. For example with the construction and circuit illustrated the South Pole of the earth core will be at the forward edge E of the left hand pole piece 24 of Figure 2 with a trace which extends upwardly to the right thusly /. A rectifier 53 may be connected between tubes 49 and 50 to pass half of the wave generated. An inductance 54 shunts the rotating condenser 48.

The hand rotation of the earth core C develops a frequency of about 6 cycles per second (C. P. S.) and this is desirable for two reasons: first there is no interference from a motor field and second the frequency of 6 C. P. S. is well below 25 C. P. S. and 60 C. P. S. from common lighting and power frequencies which may be some distance away. Because of the high amplification in the circuit such commercial frequencies can cause interference even though they may be one hundred or more feet away. In order to further assure non-interference a low pass filter 57 may be connected between the amplifier and demodulator or detector 39.

In order to increase or boost the magnetic effect of the core, a metallic booster means 60 may be used which is placed in contact with the earth core. It is shown as a disc and is made of a material such as "mumetal" which is a magnetic metal but ideally has no self-magnetism. A metal having no magnetism of its own has not yet been achieved; however, by placing the disc at the end of the earth core and in contact therewith and rotating the core in the generating means, a trace is produced upon the scope. The disc or core is rotated relatively to the other and when a maximum deflection is secured on the scope, it is known that the inherent magnetism of the booster means or disc and of the core are additive. This is to avoid the two magnetic fields from neutralizing each other or being subtractive of the magnetism of the earth core. For example, if the inherent magnetism of the disc exceeds that of the earth core and they were oppositely placed, it would be the former which generates the signal in the coils of the generator means rather than the earth core. The disc serves to provide a magnetic path for the magnetism of the core and in this way amplifies or renders more effective the magnetic field of the core. The disc is used with cores having a weak magnetic field and a different size of disc may be used depending upon the amount of amplification or boosting desired.

The disc may be placed at either end of the earth core; however, the end of the core must be fairly square with the axis of the core. Any cutting or grinding work on the core tends to reduce its earth magnetism; hence placing it on top of the core may require both ends to be squared. It is for this reason, a shallow recess is provided in the table 10 to receive the disc, which recess is slightly less than the disc so that the end of the earth core contacts the disc. So placed one end only of the core need be squared in the event it is not initially square. So constructed the earth core C can be turned independently of the plate 10 and the disc 60 to secure alignment of the magnetic fields of the earth core and disc.

The metallic parts of the generator are made of non-magnetic metal or material so that there will be no inherent magnetism of these parts to affect the operation. The voltage supply 61 preferably is battery since the analyzer is portable and also interference from an alternating current supply is avoided.

The invention is presented to fill a need for improvements in an earth core magnetic analyzer. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. An earth core magnetic analyzer for determining the magnetic orientation of a core or the like comprising a core holding means, generator means adjacent to the core holding means and including armature pole pieces with their ends spaced apart a distance to receive a core carried by the core holding means therebetween and closely adjacent thereto and coil means of at least twenty-five thousand turns on the armature to generate a voltage therein upon relative rotation between the core and the generating means, mounting means for supporting one of the generating means and the core holding means for relative rotation therebetween, manual means connected with the rotatable means to rotate the same, an electronic circuit connected with the coil means including amplifying means, and indicating means including means connected with and operable by the voltage generated in the generator means and means connected with the core holding means and operated in timed sequence therewith.

2. An earth core magnetic analyzer as in claim 1 including means to rotatably mount the core holding means.

3. An earth core magnetic analyzer as in claim 1 in which the indicating means is a cathode ray oscilloscope having vertical and horizontal beam deflecting means, a connection between the amplifying means and the vertical beam deflecting means, and including deflection voltage generating means connected with the rotatable element of the generator means and the core holding means and generating a voltage wave for each rotation thereof, and means connecting the deflection voltage generating means with the horizontal deflecting means of the oscilloscope.

4. An earth core analyzer as in claim 3 including a condenser having rotatable plates connected and rotated with the rotatable element of the voltage generating means and the core holding means, and means connecting the condenser with the horizontal beam deflecting means of the oscilloscope.

5. An earth core magnetic analyzer for determining the magnetic orientation of a core or the like comprising a core holding means, generator means adjacent to the core holding means and including armature pole pieces with their ends spaced apart a distance to receive a core carried by the core holding means therebetween and closely adjacent thereto and coil means of at least twenty-five thousand turns on the armature to generate a voltage therein upon relative rotation between the core and the generating means, mounting means for supporting one of the generating means and the core holding means for relative rotation therebetween, manual means connected with the rotatable means to manually rotate the same, an electronic circuit connected with the coil means including amplifying means; the amplifying means including an oscillator generating a carrier frequency, modulator means for modulating the carrier frequency with the core signal, and detector means for demodulating the signal; and indicating means including means connected with and operable by the voltage generated in the generator means and means connected with the core holding means and operated in timed sequence therewith.

6. An earth core magnetic analyzer for determining the magnetic orientation of a core or the like comprising a core holding means, generator means adjacent to the core holding means and including armature pole pieces with their ends spaced apart a distance to receive a core carried by the core holding means therebetween and closely adjacent thereto and coil means of at least twenty-five thousand turns on the armature to generate a voltage therein upon relative rotation between the core and the generating means, mounting means for supporting one of the generating means and the core holding means for relative rotation therebetween, manual means connected with the rotatable means to manually rotate the same, an electronic circuit connected with the coil means including amplifying means, indicating means including means connected with and operable by the voltage generated in the generator means and means connected with the core holding means and operated in timed sequence therewith, and a substantially demagnetized plate of magnetic metal to be placed at an end of the earth core.

7. An earth core magnetic analyzer for determining the magnetic orientation of a core or the like comprising a core holding means including a shallow recess in the face of the core holding means and a substantially demagnetized plate of magnetic metal received in the recess for engaging the end of the earth core, generator means adjacent to the core holding means and including armature pole pieces with their ends spaced apart a distance to receive a core carried by the core holding means therebetween and closely adjacent thereto and coil means of at least twenty-five thousand turns on the armature to generate a voltage therein upon relative rotation between the core and the generating means, mounting means for supporting one of the generating means and the core holding means for relative rotation therebetween, manual means connected with the rotatable means to manually rotate the same, an electronic circuit connected with the coil means including amplifying means, and indicating means including means connected with and operable by the voltage generated in the generator means and means connected with the core holding means and operated in timed sequence therewith.

8. An earth core magnetic analyzer for determining the magnetic orientation of a core or the like comprising a core holding means including a plate having a shoulder, a ring resting upon the plate and engaging the shoulder, and adjustable clamping means carried by the ring to grip the earth core; generator means adjacent to the core holding means and including armature pole pieces with their ends spaced apart a distance to receive a core carried by the core holding means therebetween and closely adjacent thereto and coil means of at least twenty-five thousand turns on the armature to generate a voltage therein upon relative rotation between the core and the generating means, mounting means for supporting the core holding means for rotation thereof, manual means connected with the mounting means to manually rotate the same, an electronic circuit connected with the coil means including amplifying means, and indicating means including means connected with and operable by the voltage generated in the generator means and means connected with the core holding means and operated in timed sequence therewith.

9. An earth core magnetic analyzer for determining the magnetic orientation of a core or the like comprising a core holding means including a plate having a shoulder, a ring resting upon the plate and engaging the shoulder, adjustable clamping means carried by the ring to grip the earth core, a shallow recess in the plate, and a substantially demagnetized plate of magnetic material received in the recess; generator means adjacent to the core holding means and including armature pole pieces with their ends spaced apart a distance to receive a core carried by the core holding means therebetween and closely adjacent thereto and coil means of at least twenty-five thousand turns on the armature to generate a voltage therein upon relative rotation between the core and the generating means, mounting means for supporting the core holding means for rotation thereof, manual means connected with the mounting means to manually rotate the same, an electronic circuit connected with the coil means including amplifying means, and indicating means including means connected with and operable by the voltage generated in the generator means and means connected with the core holding means and operated in timed sequence therewith.

10. An earth core magnetic analyzer for determining the magnetic orientation of a core or the like comprising a core holding means, generator means adjacent to the core holding means and including armature pole pieces with their ends spaced apart a distance to receive a core carried by the core holding means therebetween and closely adjacent thereto and coil means of at least twenty-five thousand turns on the armature to generate a voltage therein upon relative rotation between the core and the generating means, mounting means for supporting one of the generating means and the core holding means for relative rotation therebetween, manual means including speed amplifying means connected with the rotatable means to rotate the same at approximately six cycles per second, an electronic circuit connected with the coil means including amplifying means, and indicating means including means connected with and operable by the voltage generated in the generator means and means connected with the core holding means and operated in timed sequence therewith.

11. An earth core magnetic analyzer as in claim 10 in which the mounting means supports the core holding means for rotation.

References Cited in the file of this patent

UNITED STATES PATENTS

| Number | Name | Date |
| --- | --- | --- |
| Re. 21,927 | Brace et al. | Oct. 21, 1941 |
| 2,105,650 | Hering et al. | Jan. 18, 1938 |
| 2,260,562 | Dillon | Oct. 28, 1941 |
| 2,334,393 | Dillon | Nov. 16, 1943 |
| 2,425,361 | Brown | Aug. 12, 1947 |
| 2,470,839 | Zuschlag | May 24, 1949 |
| 2,519,367 | Gunn | Aug. 22, 1950 |

FOREIGN PATENTS

| Number | Country | Date |
| --- | --- | --- |
| 164,977 | Great Britain | June 23, 1921 |
| 600,913 | Great Britain | Apr. 22, 1948 |